United States Patent Office 3,422,037
Patented Jan. 14, 1969

3,422,037
PROCESS FOR THE PRODUCTION OF FLAME RESISTANT POLYURETHANE FOAMS
Kazumi Yamamoto, Mitsuhiro Iwasa, Kenji Ema, and Noboru Arai, Nagoya, Japan, assignors to Mitsui Kagaku Kogyo Kabushiki Kaisha Matsui Chemical Industry Co., Ltd., Tokyo, Japan, a corporation of Japan
Filed June 28, 1966, Ser. No. 561,019
Claims priority, application Japan, July 3, 1965, 40/39,548, 40/39,549
U.S. Cl. 260—2.5                    7 Claims
Int. Cl. C08g 22/44; C08g 22/14

ABSTRACT OF THE DISCLOSURE

A flame resistant phosphrous-containing polyurethane foam wherein at least a portion of the polyol component reacted with an organic polyisocyanate component comprises a high molecular weight phosphorous-containing polyol obtained by the intermolecular condensation of a polyether polyol and the intramolecular condensation product of a trisdialkylene glycol phosphite.

---

This invention relates to the production of a flame resistant polyurethane foams. More particularly, the invention relates to a process for the production of flame resistant, phosphorous-containing polyurethane foams which comprise organic polyisocyanate and polyol, characterized by the use of high molecular, polyfunctional phosphorus-containing polyol, obtained by the intermolecular condensation between conventional polyol and intermolecular condensation product of trisdialkylene glycol phosphite, as at least a part of the said polyol component.

Generally polyurethane foam is prepared from conventional polyetherpolyol (hereinafter it will be briefly referred to as conventional polyol) and organic polyisocyanate, for example, tolylene diisocyanate, in the optional presence of water, and to the reaction system such assistants are added as silicone oil and the like to serve as surfactant; amines, organic tin compounds and the like as catalyst; and often trichlorofluoromethane as foaming agent. As "conventional polyol," polyether- and polyester-type polyols are used. It is known that polyether-type polyols are obtained by the reaction of alkylene oxide such as ethylene oxide, propylene oxide to polyhydric alcohol such as glycerine, trimetholpropane, hexanetriol, pentaerythritol, sorbitol and sucroes, or polyvalent amine such as ethylenediamine, or precondensate of phenolic resin, and that polyester-type polyols are obtained by the reaction of polybasic acid such as adipic acid and dimer acid with polyhydric alcohol such as ethylene glycol, diethylene glycol and glycerine are known.

However, polyurethane foams obtained from the reaction of such conventional polyols with polyisocyanate are combustible, and therefore have a disadvantage to use as building materials (heat insulating material), other construction materials and upholstery such as cushion.

As methods for overcoming this disadvantage and for imparting flame resistance to polyurethane foam, addition of phosphous-containing compounds such as ammonium phosphate, tris($\beta$-chloroethyl)phosphate, tris($\beta$-$\gamma$-dibromopropyl) phosphate, etc., or antimony trioxide or pentoxide was proposed. However the foams obtained by such method has a tendency of deterioration in physical properties because such additives are only mixed in the polyurethanes as mixed therewith, not fixed with polyisocyanate. Furthermore their flame resistant properties tend to deteriorate with passage of time, and also because the additives are easily removable by washing, the combustion resistance of the foam is apt to so deteriorate.

As a solution to that problem there has been another attempt to use such polyester polyols containing phosphorus, chlorine or bromine in its molecular chain at least as a part of the polyol component. As that type of polyols, alkylene oxide addition products of pyro- or polyphosphoric acid are particularly well known. These polyols, however, do not provide forms of satisfactory properties because they bring about such undesirable effects as scorching in the foam caused by the heat generated by foaming, yellowing of the foam, or deterioration in the properties of the foam, inter alia, compression set property of flexible polyurethane foams.

Accordingly, an object of the present invention is to provide a process for the production of flame resistant polyurethane foams without impairing the physical properties of the product.

Another object of the present invention is to provide a process for the production of polyurethane foams having little yellowing tendency without impairing the physical properties of the product.

Still another object of the present invention is to provide a process for the production of polyurethane foams of varied hardness such as flexible, semirigid and rigid foams, without impairing the physical properties of the production.

Those objects of the present invention are achieved, as at least a part of the polyol component for the production of polyurethane foams, by the use of high molecular, polyfunctional, phosphorus-containing polyol obtained by the intramolecular condensation reaction of tris-dialkylene glycol phosphite represented by the general formula $P(OROH)_3$ (wherein R stands for $$-CH_2-CH_2-O-CH_2-CH_2-$$

$$-CH_2-CH_2-O-CH_2-\overset{CH_3}{\underset{|}{C}H}-$$

or $$-CH_2-\overset{CH_3}{\underset{|}{C}H}-O-CH_2-\overset{CH_3}{\underset{|}{C}H}-$$

residue) and further intermolecular condensation of the high molecular phosphorus acid ester polyol produced in the above with conventional polyol. Thus the phosphorus-containing polyol having still more functional group is imparted.

Normally heat condensation of tris-monoalkylene glycol phosphite such as ethylene glycol often results in the formation of cyclic phosphorous acid triester, i.e.,

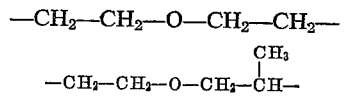

or

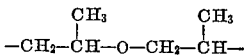

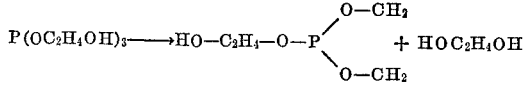

as the intramolecular condensation takes place, or results in gellation. Therefore it is impossible to synthesize the high molecular phosphorous acid ester polyol satisfying the object of the present invention by the above means. Accordingly we attempted to produce flame resistant polyurethane foams by preparing so-called reactive type phosphorus-containing polyol which can effectively impart flame resistance to polyurethane compositions, particularly flexible polyurethane foams, and using the same as the starting material. "Reactive type" herein mentioned refers to the chemical structure having in its molecule active hydrogens capable of reacting with isocyanate groups at the time of polyurethane composition formation. And, after extensive research work we arrived at the present invention.

On heating tris-dialkylene glycol phosphite previously expressed by the general formula $P(OROH)_3$ under a reduced pressure, liquid high molecular phosphorus-containing polyol is formed accompanied by distilling of dialkylene glycol as intramolecular condensation takes place. This high molecular phosphorus-containing polyol (hereinafter this is referred to as I-type high molecular phosphorus-containing polyol) is a novel compound, which is normally colorless and viscous liquid. Although the reaction mechanism must be clarified upon further study, the reaction probably takes place in accordance with the formula below.

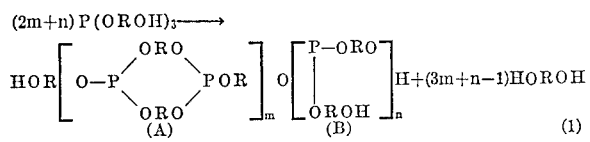

(1)

In the above formula, R has the significance as defined in the foregoing, $n$ is an integer of 0–3 and $m$ is an integer of 1–8. Again the recurring structural units (A) and (B) in the polymer chain are expressed as in the above for convenience' sake, but they are presumably randomly disposed, not always forming respectively $m$ and $n$ block chains as shown in the above formula. Thus the said I-type high molecular phosphorus-containing polyol presumably consists of statistical mixture of various polymers of varied molecular weights and varied number in functional groups (number of hydroxyl groups in the polymer molecule).

The aforesaid intramolecular condensation reaction of tris-dialkylene glycol phosphite is normally performed at the temperature of 90–180° C. under reduced pressure of 10 mm. Hg or below. The reaction proceeds in the absence of catalyst, but particularly in the presence of the below-indicated alkali compound as the catalyst progresses very smoothly. As such catalyst, alcoholate, hydroxide, carbonate and acetate, etc., of alkali metal may be named. The suitable amounts of such catalyst to be used may be very small, such as 0.01–0.2 wt. percent to the starting material, preferably 0.03–0.1 wt. percent. After completion of the reaction the catalyst should be removed from the reaction system by means of an adsorbent such as aluminum- or magnesium-silicate, or by a treatment with nonaqueous cation-exchange resins. The average hydroxyl value of I-type high molecular phosphorus-containing polyol (number in mg. of KOH consumed per 1 g. of the polyol) can be optionally controlled within the range of 30–350 by means of regulating the amount of dialkylene glycol distilled. Again the phosphorus content of the polyol can also be controlled within the range of 8–14 wt. percent, by controlling the degree of condensation.

Tris-dialkylene glycol phosphite which serves as the starting material of the above I-type phosphorus-containing high molecular polyol can be quite easily synthesized by reaction of phosphorus trichloride with dialkylene glycol monoalkalialcoholate, or condensation reaction of triphenyl phosphite with dialkylene glycol in the manner of accepted practice.

In case triphenyl phosphite and dialkylene glycol are used as the starting materials as mentioned above, it is also possible to omit the separation step of the so formed tris-dialkylene glycol phosphite but to subject the reaction system as it is to further condensation reaction to produce the I-type high molecular phosphorus-containing polyol.

The dialkylene glycol used for the production of I-type high molecular phosphorus-containing polyol may be those of industrial grades containing up to 20 wt. percent, preferably no greater than 10 wt. percent, of tri- or tetraalkylene glycol as impurity. Dialkylene glycol containing such high homologue of alkylene glycols in an amount greater than the above-set limit hardly gives the desired high molecular polyol because the said impurity promotes gellation of the reaction product as the condensation reaction advances.

Thus obtained I-type phosphorus-containing high molecular polyol is, singly or as blended with conventional polyol, reacted with polyisocyanate, particularly tolylene diisocyanate and the resultant polyurethane is foamed in accordance with the accepted practice to yield flexible or rigid foam having excellent flame resistance and physical properties. Furthermore, the excellent flame resistance and physical properties can be still improved by the technique provided by the present invention as described hereinbelow.

To wit, upon further reaction of the said I-type phosphorus-containing high molecular polyol with conventional polyol under the below-specified conditions, intermolecular condensation takes place to form phosphorus-containing high molecular polyol having a still greater number of functional groups (hereinafter this polyol will be referred to as II-type phosphorus-containing high molecular polyol), which is found to be capable of imparting still better flame resistance and physical properties to the polyurethane foams formed therefrom.

The intermolecular condensation of I-type phosphorus-containing high molecular polyol with conventional polyol is performed by heating the two components to a temperature of 120–200° C. under a reduced pressure of 10 mm. Hg or below in the optional presence of catalyst, while distilling off the dialkylene glycol formed by the ester-interchange reaction. As particularly effective catalyst, alcoholate, hydroxide, carbonate and acetate, etc., of alkali metal may be named. Use of only a minor amount of such catalyst is sufficient for the purpose, such as 0.01–0.2 wt. percent to the I-type phosphorus-containing high molecular polyol used as the starting material, preferably 0.03–0.1 wt. percent. After completion of the reaction the catalyst is removed from the system by means of an adsorbent such as magnesium or aluminum silicate.

The reaction mechanism and structure of thus formed novel II-type high molecular phosphorus-containing polyol are not yet completely clarified, but are presumed as follows:

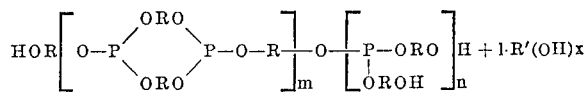

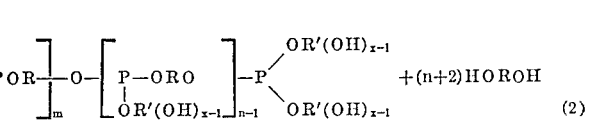

(2)

Whereas, when $n$ of the I-type high molecular phosphorus-containing polyol is zero, the formula is presumably as follows.

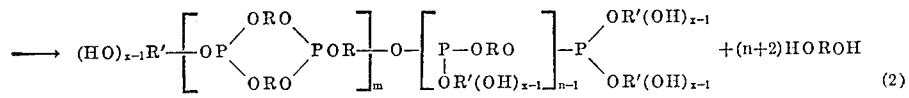

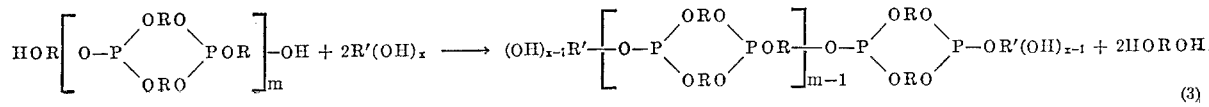

(3)

In the above Formulae 2 and 3, R, m and n have the significance as defined with reference to the Formula 1; R' stands for residue of conventional polyol; l is a number within the range of $$\left(\frac{n+2}{x}\right) - (u+2)$$

and x is the number of hydroxyl groups in the conventional polyol.

These formulae denoting the case wherein only one of the hydroxyl groups in one $R'(OH)_x$ molecule participates in the reaction, such cases wherein $2-x$ hydroxyl groups participate in the reaction can also be understood in conformity with the above-given formulae.

Again the above reaction formulae show the case wherein all of the terminal —ROH groups of I-type phosphorus-containing polyol are replaced by conventional polyols, but it is also permissible that only a part thereof is replaced by the conventional polyol. In such a case, the reaction may be expressed by the formula below.

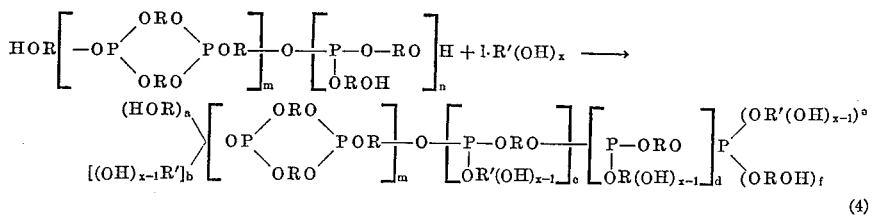

(4)

In this case if n of the I-type high molecular phosphorus-containing polyol is zero, the above Formula 4 should be modified in conformity with the foregoing Formula 2.

Furthermore, when 2 or more hydroxyl groups of one $R'(OH)_n$ molecule participate in the above reaction, the mechanism again should be understood in conformity with the Formula 4.

In the said Formula 4, R, R', m, n and x have the significance as defined with reference to the Formula 2; a and b are each zero or 1 and $a+b=1$; c and d are each zero or an integer no less than 1 and $c+d=n-1$; e and f are each zero, 1 or 2 and $e+f=2$; and l is a number within the range of $$\left(\frac{b+c+e}{x}\right) - (b+c+e)$$

Note when $n=0$, items c and d are absent.

The amount of I-type high molecular phosphorus-containing polyol to be reacted with conventional polyol varies depending on the hydroxyl values of the reactants. Normally the hydroxyl value of I-type high molecular phosphorus-containing polyol ranges from 30–350 (mostly 100–200), and when the hydroxyl value of conventional polyol is 50–60, the amount of the I-type phosphorus-containing high molecular polyol to be used may range around 10–50 wt. percent of the conventional polyol. Again when the conventional polyol is that for making rigid polyurethane foam, which has a hydroxyl value of 400–600 (polyoxypropylene polyol prepared from sucrose, sorbitol, glycerine, etc.), 30–500 wt. percent thereof of I-type phosphorus-containing high molecular polyol is used. Normally in order to produce satisfactory flame resistance polyurethane foams, phosphorus should be contained from 1 to 5% by weight to the total polyol material. The II-type high molecular phosphorus-containing polyol of the invention is used as the starting polyol component to form flame resistant polyurethane foams either singly (i.e., as the entirety of the required polyol component) or as blended with conventional polyols (i.e., as a minor or greater portion of the required polyol component) in accordance with the phosphorus content required as mentioned in the above. The II-type high molecular phosphorus-containing polyol is mixed easily with conventional polyols and obtained homogeneous and transparent blended polyols.

The hydroxyl value of II-type high molecular phosphorus-containing polyols can be freely controlled within the range lower than that of the blended material independently of the hydroxyl value of the I-type high molecular phosphorus-containing polyol used as the starting material, by varying the conversion of the ester-interchange reaction (the ratio between the amount of dialkylene glycol actually distilled off the system and the theoretical distillation amount of the dialkylene glycol in case all of the terminal alkylene glycol groups of the I-type high molecular phosphorus-containing polyol are ester-interchanged with conventional polyol).

For example, when 70 parts by weight of a conventional polyol having a hydroxyl value of 56 and 30 parts by weight of I-type high molecular phosphorus-containing polyol having a hydroxyl value of 50 were blended and subjected to the ester-interchange reaction (Experiment 1), and when the same conventional polyol was blended with I-type high molecular phosphorus-containing polyol having a hydroxyl value of 100 and subjected to the ester-interchange reaction (Experiment 2), the hydroxyl value of the resultant II-type high molecular phosphorus-containing polyol can be controlled as in the Table 1 below.

TABLE 1

| Conversion of ester-interchange (percent) | Hydroxyl value of II-type high molecular phosphorus-containing polyol | |
| --- | --- | --- |
| | Exp. 1 | Exp. 2 |
| 0 (at the time of blending the materials) | 54 | 69 |
| 50 | 40 | 40 |
| 100 | 25 | 10 |

This is one of the notable advantages of the present invention.

The following examples will serve to illustrate the practice of the invention in more detail.

EXAMPLE 1

(A) Preparation of I-type high molecular phosphorus-containing polyol

To 860 g. of tris-dipropylene glycol phosphite, 0.30 g. of potassium carbonate was added, and the system was subjected to condensation reaction at 130–160° C. under a pressure of 4 mm. Hg in the atmosphere of nitrogen. Upon distillation off of 358 g. of dipropylene glycol 502 g. of viscous, crude I-type high molecular phosphorus-containing polyol was obtained, of which phosphorus content was 12.0 wt. percent.

(B) Preparation of II-type high molecular phosphorus-containing polyol 368 grams of the polymer containing the catalyst as obtained in the above step (A) was placed in a 2l four necked flask together with 858 g. of glycerine-based polyoxypropylenetriol having a hydroxyl value of 56 and stirred, followed by heating at 150–160° C. under a pressure of 5 mm. Hg in the atmosphere of nitrogen. Thereupon distillation of dipropylene glycol started, and when 61.0 g. of the same was distilled off, 4 g. of magnesium silicate was added to the reaction product, followed by 2 hours' stirring at 80° C. Thereafter the system was filtered to produce 1140 g. of the desired product, which was a colorless, viscous liquid having a hydroxyl value of 35 mg. KOH/g. and a phosphorus content of 3.7 wt. percent.

(C) Preparation of flexible polyurethane foam 459 grams of the II-type high molecular phosphorus-containing polyol obtained in the above step (B) was mixed with 641 g. of glycerine-based polyoxypropylenetriol having a hydroxyl value of 56 to produce a blended polyol. To 100 g. of the same polyol, 1.5 g. of silicone oil L-520 (commercial product by Union Carbide Corporation, U.S.A.), 0.1 g. of stannous octoate, 0.5 g. of dimethyl ethanolamine and 3.6 g. of water were added, and they were mixed under vigorous agitation at room temperature.

To the mixture then 45.2 g. of mixture of 2,4- and 2,6-toluylene diisocyanates of isomeric weight ratio 80/20 (hereinafter this is referred to simply as 80/20 TDI) was added, immediately followed by 5 seconds' vigorous stirring. The system was then poured into a 17 cm. x 17 cm. x 17 cm. cardboard mould. The foaming completed within about 70 seconds, and white foam was obtained, which was subsequently cured in oven at 120° C. for 30 minutes and let stand for 12 hours at room temperature. Thereafter the physical properties of the foam were shown in Table 2.

As indicated in the same table, this foam is self-extinguishing and furthermore is flexible polyurethane foam of excellent compression set property.

TABLE 2

| | |
|---|---|
| Density (g./cm.$^3$) | 0.0325. |
| Tensile strength (kg./cm.$^2$) | 1.20. |
| Elongation (percent) | 185. |
| Hardness $^1$ (kg./314 cm.$^2$): | |
| 25% compression | 22.3. |
| 50% compression | 32.8. |
| Compression set (percent, 70° C., 22 hrs., 50% compression) | 5.4. |
| Test for flammability: $^2$ | |
| Classification | Self - extinguishing. |
| Burning distance (cm.) | 4.5. |
| Light stability | No coloring after about one month. |

$^1$ ASTM-D-1564-59T.
$^2$ ASTM-R-1692-59T.

EXAMPLE 2

(A) Preparation of I-type high molecular phosphorus-containing polyol

To 430 g. of tris-dipropylene glycol phosphite, 0.15 g. of potassium carbonate was added and the system was condensed at 130–160° C. under a pressure of 4 mm. Hg in the atmosphere of nitrogen until 179 g. of dipropylene glycol was distilled off. Treating the condensation product with 4 g. of magnesium silicate, 205 g. of colorless, transparent I-type high molecular phosphorus-containing polyol was obtained. This I-type high molecular phosphorus-containing polyol had a hydroxyl value of 114 mg. KOH/g., a viscosity of 1,500 cps. (25° C.) and a phosphorus content of 12.0 wt. percent.

(B) Preparation of II-type high molecular phosphorus-containing polyol 180 grams of the I-type high molecular phosphorus-containing polyol of (A) above was placed in a 1 l. four necked flask with 820 g. of glycerine-based polyoxypropylene triol (hydroxyl value=56), and heated to 180–190° C. under a pressure of 4 mm. Hg in the atmosphere of nitrogen. After about 4 hours when 272 g. of dipropylene glycol was distilled off, 972.8 g. of II-type high molecular phosphorus-containing polyol having a phosphorus content of 2.22 wt. percent and a hydroxyl value of 45.9 mg. KOH/g. was obtained.

(C) Preparation of flexible polyurethane foam

To 700 g. of the II-type high molecular phosphorus-containing polyol obtained in the step (B) above, 10.5 g. of silicone oil L-520, 0.7 g. of stannous octoate, 7.0 g. of dimethyl ethanolamine and 25.2 g. of water were added with vigorus agitation at room temperature. After adding 308 g. of 80/20TDI the mixture was stirred for 5 seconds and the system was poured into a 40 cm. x 40 cm. x 40 cm. cardboard mould. The foaming was completed within about 65 seconds, and the resultant foam was cured in 120° C. oven for 30 minutes and thereafter let stand for 12 hours at room temperature. The following physical properties of the foam were measured as shown in Table 3. As can be seen from the same table, the product is self-extinguishing and is flexible polyurethane foam having particularly excellent compression set property.

TABLE 3

| | |
|---|---|
| Density (g./cm.$^3$) | 0.0254 |
| Tensile strength (kg./cm.$^2$) | 0.91 |
| Elongation (percent) | 170 |
| Hardness (kg./314 cm.$^2$): | |
| 25% compression | 14.0 |
| 50% compression | 18.5 |
| Compression set (percent, 70° C., 22 hrs. 50% compression) | 4.6 |
| Test for flammability: | |
| Classification | ($^1$) |
| Burning distance (cm.) | 2.6 |
| Light stability | ($^2$) |

$^1$ Self-extinguishing.
$^2$ No discoloration after about one month.

The testing methods are same as in Example 1.

EXAMPLE 3

(A) Preparation of I-type high molecular phosphorus-containing polyol 430 grams of tris-dipropylene glycol phosphite containing 0.10 of potassium carbonate was condensed at 130–140° C. under a pressure of 5 mm. Hg in the atmosphere of nitrogen. When 125 g. of dipropylene glycol distilled off, the condensation reaction was suspended, and the product was treated with 4 g. of aluminum silicate. Upon subsequent filtration, 290 g. of light yellow I-type high molecular phosphorus-containing polyol was obtained, which had a hydroxyl value of 300 mg. KOH/g., a viscosity of 590 cps. (25° C.) and a phosphorus content of 10.0 wt. percent.

(B) Preparation of II-type high molecular phosphorus-containing polyol

Into a 500 cc. four necked flask 200 g. of the I-type high molecular phosphorus-containing polyol obtained in the step (A) above and 200 g. of sucrose-based polyoxypropylene polyol (hydroxyl value=460 mg. KOH/g.) were placed and heated to 150–160° C. at 5 mm. Hg in the atmosphere of nitrogen. After about 2 hours 49 g. of dipropylene glycol distilled off, and 351 g. of II-type high molecular phosphorus-containing polyol was obtained. The same polyol had a hydroxyl value of 310 mg. KOH/g. and a phosphorus content of 5.2 wt. percent.

(C) Preparation of rigid polyurethane foam

With 77 wt. percent of the II-type high molecular phosphorus-containing polyol obtained in the step (B) above, 23 wt. percent of sucrose-based polyoxypropylene octanol (hydroxyl value=460 mg. KOH/g.) was blended. To 100 g. of the resultant blended polyol, 30.4 g. of trichloromonofluoromethane was added, and after thorough agitation 1.52 g. of silicone oil DC-113 (commercial product of Dow Corning Co., U.S.A.), 0.51 g. of triethylenediamine and 0.51 g. of triethylamine were added thereto, followed by 20 seconds' stirring. Then to the mixture 72.2 g. of crude 80/20 TDI was quickly added, immediately followed by 5 seconds' vigorous agitation. The mixture was poured into a 17 cm. x 17 cm. x 17 cm. cardboard mould, and the resultant foam was cured for 24 hours at room temperature. The physical properties of the foam were shown in Table 4 below.

As indicated in the same table, the foam is self-extinguishing, and is a rigid polyurethane foam of excellent compressive strength.

TABLE 4

| | |
|---|---|
| Density (g./cm.³) | 0.0330 |
| Compressive strength [1] (kg./cm.²): | |
| Parallel to rise | 2.80 |
| Perpendicular to rise | 1.50 |
| Test for flammability: [2] | |
| Classification | ([3]) |
| Burning distance (cm.) | 1.3 |
| Scorching inside the foam | None |

[1] ASTM-D-1621-59T.
[2] ASTM-D-1692-59T.
[3] Self-extinguishing.

We claim:
1. A polyurethane foam prepared by reacting an organic polyisocyanate and a polyol component with subsequent foaming, said polyurethane foam being characterized in that at least a portion of said polyol component comprises a high molecular weight phosphorus-containing polyol obtained by an intermolecular condensation between a polyether polyol and an intramolecular condensation product of tris-dialkylene-glycol phosphite of the formula P(OROH)₃ wherein R is a residue selected from the group consisting of

—CH₂—CH₂—O—CH₂—CH₂—
—CH₂—CH₂—O—CH₂—CH(CH₃)—and
—CH₂—CH(CH₃)—O—CH₂—(CH₃)—

2. The polyurethane foam of claim 1 wherein the intramolecular condensation reaction of said tris-dialkylene glycol phosphite is performed in the presence of a catalyst selected from the group consisting of alcoholate, hydroxide, carbonate and acetate of alkali metal, at a reduced pressure no higher than 10 mm. Hg and a temperature ranging 90–180° C.

3. The polyurethane foam of claim 2 in which the amount of the catalyst ranges 0.01–0.2% by weight based on said tris-dialkylene glycol phosphite.

4. The polyurethane foam of claim 1 wherein said intermolecular condensation is conducted at a reduced pressure no higher than 10 mm. Hg and a temperature ranging from 120–200° C.

5. The polyurethane foam of claim 4 wherein said intermolecular condensation is performed in the presence of a catalyst selected from the group consisting of the alcoholate, hydroxide, carbonate, and acetate of an alkali metal.

6. The polyurethane foam of claim 5 wherein the amount of said catalyst is 0.01–0.2% by weight based on said phosphorus-containing polyol.

7. The polyurethane foam of claim 1 wherein said polyether polyol comprises a polyether triol.

References Cited

UNITED STATES PATENTS

| | | | |
|---|---|---|---|
| 3,142,650 | 7/1964 | Friedman | 260—2.5 |
| 3,142,651 | 7/1964 | Friedman | 260—2.5 |
| 3,152,164 | 10/1964 | Oswald | 260—461 |
| 3,201,435 | 8/1965 | Schulz | 260—461 |
| 3,317,510 | 5/1967 | Birum | 260—210 |
| 3,324,202 | 6/1967 | Franko-Filipasic | 260—920 |
| 3,354,241 | 11/1967 | Larrison | 260—929 |

DONALD E. CZAJA, *Primary Examiner.*

M. B. FEIN, *Assistant Examiner.*

U.S. Cl. X.R.

260—45.7, 77.5, 920, 929